United States Patent Office 3,419,533
Patented Dec. 31, 1968

3,419,533
POLYURETHANE PLASTICS
Dieter Dieterich, Leverkusen, Germany, assignor to Farbenfabriken Bayer Aktiengesellschaft, Leverkusen, Germany, a corporation of Germany
No Drawing. Filed Dec. 23, 1965, Ser. No. 516,123
Claims priority, application Germany, Dec. 28, 1964, F 44,826
6 Claims. (Cl. 260—77.5)

ABSTRACT OF THE DISCLOSURE

Plastics containing sulfonium sulfur groups which are prepared by reacting an active hydrogen containing compound with an organic polyisocyanate, at least one of which contains sulfide sulfur atoms which have either been partially alkylated before the reaction or which are subsequently at least partially alkylated. The plastics are substantially free of unpleasant odors. The plastics are suitable for coatings, films, filaments, foils, photographic layers, sizing agents, impregnating leather, binding dyestuff pigments, and hair dressings.

This invention relates to polyurethane plastics and more particularly to polyurethane plastics which contain sulfonium groups.

In German Patent 880,485, a process is disclosed for treating high molecular weight compounds such as polyesters, polyurethanes or polyamides, which contain a thioether group in the molecule, with polyfunctional peralkylating agents, thus converting them, with simultaneous cross-linking, into synthetic resins carrying sulfonium groups. In this process, the addition of monofunctional ternating agents results in an increase in the solubility in hydrophilic media.

The increase in the hydrophilic properties of a high or low molecular weight substance which results from monofunctional quaternating or ternating is generally known and used for many purposes. However, since ternating alone with monofunctional alkylating agents does not result in chain-lengthening or cross-linking, it has hitherto been necessary to include polyfunctional alkylating agents or other cross-linking agents, e.g. those based on urea formaldehyde, in order to obtain cross-linked and therefore water-insoluble, elastic, non-sticky materials. In order to reduce premature cross-linking, this has generally required the use of a two-component system and/or an after-treatment, e.g. by heating to an elevated temperature, to effect cross-linking.

It is, therefore, an object of this invention to provide polyurethane plastics which contain sulfonium groups and which have advantageous physical properties. Another object of this invention is to provide for polyurethane plastics containing sulfonium groups in a critical amount which are substantially free of unpleasant odors. A further object of this invention is to provide sulfonium containing polyurethane plastics which do not have a basic group. Still another object of this invention is to provide an improved method of preparing polyurethane plastics based on sulfonium containing compounds which have improved physical properties.

The foregoing objects and others which will become apparent from the following description are accomplished in accordance with the invention, generally speaking, by providing a plastic prepared by a process which comprises reacting an organic compound containing two active hydrogen containing groups as determined by the Zerewitnoff method with an organic polyisocyanate, at least one of the components containing sulphide sulphur atoms which are partially alkylated or sulfide sulfur atoms which are subsequently alkylated to introduce sulfonium groups into the plastic in an amount more than about 1 percent and preferably from about 1 percent to about 5 percent by weight. Generally not more than 7 percent by weight should be present.

It was therefore very unexpected that the polyurethanes prepared according to the present invention and described in more detail hereinafter, which have been polyternated with monofunctional alkylating agents and are otherwise predominately linear, are elastic, non-sticky and water-insoluble materials.

The subject of the present invention is a process for the preparation of elastic synthetic resins containing sulfonium groups, especially foils, coatings and adhesifying agents, by the isocyanate polyaddition process based on reaction products of polyhydroxy compounds, polyisocyanates and if desired, chain-lengthening agents having reactive hydrogen atoms. The process is characterised in that uncross-linked reaction products containing sulphide sulphur atoms which may be partly alkylated are reacted with monofunctional alkylating agents, or noncross-linked reaction products which may contain already partially alkylated halogen atoms or R—SO$_2$—O— groups (in which R denotes an alkyl or aryl radical preferably having 1–12 carbon atoms) are reacted with monofunctional sulphides during or after the preparation of the reaction product in such a manner that the polyurethane composition contains more than 1% sulphonium sulphur.

The new process produces materials in which salt-type ternated and organophilic molecular segments alternate with each other, the organophilic segments having a chain length of at least 30 atoms. The reaction products, which are generally rubber-like, are preferably ternated in solution, so that an elastic cross-linked synthetic resin is obtained after suitable removal of the solvent.

The organic compound containing active hydrogen containing groups as determined by the Zerewitnoff method are preferably polyhydroxy compounds which are preferably at least predominantly linear and have a molecular weight of about 400 to about 10,000, preferably about 1000 to about 5000. Such compounds are, for example, polyethers, polyesters, polyacetals, polyester amides and polymerisation products of tetrahydrofuran, propylene oxide and ethylene oxide and copolymerisation or graft polymerisation products of these compounds. It is possible to start either from uniform or from mixed polyethers obtained, for example, by condensation, e.g., of 1,6-hexanediol, 3 - methyl - 1,6 - hexanediol, 1,7 - heptanediol or 1,8-octanediol, if desired with the addition of 10 to 30% of lower glycols such as ethylene glycol, 1,3-propylene glycol, 1,4-butane diol and the like. Ethoxylated and propoxylated (or mixed alkoxylated) glycols may also be used.

Suitable polyacetals include in particular the water-insoluble types of polyacetal obtained from 1,6-hexanediol and formaldehyde or 1,6-hexanediol and divinylether, and those obtained from 4,4′-dihydroxy-ethoxy-diphenyl-dimethylmethane and formaldehyde.

Also to be mentioned are polyesters and polyester amides which are obtained in known manner from polyhydric alcohols and preferably glycols such as ethylene glycol, 1,4-butane diol, 1,6-hexane diol and polybasic carboxylic acids such as adipic acid, sebacic acid, phthalic acid and the like, if desired with the addition of diamines and amino alcohols such as ethylene diamine, ethanol amine and the like.

It is, of course, also possible to use other polyesters containing hydroxyl groups, i.e., such polyesters which have been prepared by different methods, e.g., polyethylene terephthalates or polycarbonates.

Examples of polyhydroxy compounds which contain sulphide sulphur that can be alkylated are condensation products of thiodiglycols either with itself and/or with other glycols, dicarboxylic acids, formaldehyde, aminocarboxylic acids or amino alcohols, examples of which are set forth above. Depending on the components used, these products are polythioethers, mixed polythioethers, polythioether esters or polythioether ester amides. Such polyhydroxy compounds may also be used in the alkylated form if further components are included in the preparation of the reaction products which contain ternatable groups for the process according to the invention.

It is also possible to use polyhydroxy compounds which contain basic nitrogen atoms, e.g., polyalkoxylated primary amines or polyesters or polythioethers into which alkyl diethanolamine such as N-ethyl-, N-methyl-, N-propyl-diethanolamine has been incorporated by condensation. Compounds containing reactive halogen atoms may also be incorporated by condensation, e.g., epichlorohydrin glycerol-α-chlorohydrin and the like. Such compounds may also be used in the alkylated or onium form if in the preparation of the reaction products further components have been added which contain ternatable groups for the process according to the invention.

It is also possible to start from polyhydroxy compounds which already contain urethane or urea groups. The polyhydroxy compounds may, of course, be mixed together, and those containing ternatable groups may also be mixed with those that do not contain such groups.

Any suitable organic diisocyanate may be used such as any aliphatic or aromatic diisocyanate such as, for example, as 1,5-naphthalene diisocyanate, 4,4′-diphenylmethane diisocyanate, 4,4′-dibenzyldiisocyanate, 1,3-phenylenediisocyanate, 1,4-phenylenediisocyanate, 2,4- and 2,6-toluylene diisocyanate and isomeric mixtures thereof, tetra-alkyl-diphenylmethane-diisocyanate, such as 2,2′-, 6,6′-dimethyl-diphenylmethane-4,4′-diisocyanate, dicyclohexylmethane-4,4′-diisocyanate, hexane-1,6-diisocyanate, butane-1,4-diisocyanate and polyisocyanates having reactive halogen atoms, e.g., 1 - chloromethylphenyl - 2,4 - diisocyanate, 1-bromomethyl-phenyl-2,6-diisocyanate or 3,3′-bischloro-methylether-4,4′-diphenyldiisocyanate. Isocyanates with masked NCO groups, e.g., dimeric 2,4-toluylene diisocyanate, may also be used. Polyisocyanates which contain sulphur may, for example, be obtained by reacting 2 mols of hexamethylene diisocyanate with 1 mol thiodiglycol or dihydroxydihexyl-sulphide.

Chain lengthening agents with reactive hydrogen atoms, which may be included if desired, are glycols, polyhydric alcohols, amino alcohols, diamines and water. The following are examples of such compounds: ethylene glycol, di-, tri-, tetraethylene glycol, 1,3-butanediol, 1,4-butanediol, 1,2-propanediol, 1,3-propane-diol, neopentylglycol, 1,6-hexanediol, dihydroxy-ethoxyhydro-quinone, dihydroxyethyldian, 1,4-bis-hydroxymethyl-cyclohexane, ethylene diamine, hexamethylenediamine, 4,4′-diamino-diphenyl-methane, 3,3′ - dichloro - diamino - diphenylmethane and amino-ethanol. Preferably, at least a certain proportion of chain-lengthening agents containing sulphide sulphur atoms are used for building up the polyurethane masses. Suitable examples are thiodiglycol, diisopropanol-(2)-sulphide, dihydroxy-dihexylsulphide, diaminodipropyl-sulphide, bis-(β-hydroxyphenyl-ethyl)-sulphide, S-methyl-thioglycerol, thiodiglycollic acid, sulphide-β-dipropionic acid, sulphide-α-dibutyric acid and compounds of the type HO—$(CH_2)_2$—S—R—S—$(CH_2)_2$—OH which may also contain hetero atoms and in which R denotes a divalent hydrocarbon radical. Chain lengthening agents which contain basic nitrogen may also be included, e.g., methyl-diethanolamine, N-cyclohexyl-diethanolamine, N-cyclohexyldiisopropanolamine, dihydroxyethylaniline, dihydroxyethyltoluidine, and dihydroxyethylpiperazine. Examples of chain-lengthening agents which contain halogen atoms or R—$SO_2$—O-groups capable of being ternated are glycerol-α-chlorohydrin, glycerol-monotosylate, pentaerythritol-bis-benzenesulfonate, glycerol-monomethanesulfonate methyl toluene sulfonate.

The reaction components are reacted by known processes. The sequence in which the components are added together is immaterial. The quantity of polyisocyanates may be in excess of or equivalent to or less than equivalent to the reactive hydrogen atoms of the polyhydroxy compound put into the reaction and if desired also the chain lengthening agent. The NCO:OH ratio is preferably 0.8:1 to 1.4:1.

The reaction may also be carried out in inert organic solvents, for example in benzene, chlorobenzene, tetrachloroethane, acetone, methyl ethyl ketone, dioxane, tetrahydrofuran or ethylacetate.

Examples of suitable monofunctional alkylating agents are methyl chloride, methyl bromide, butyl bromide, dimethylsulfate, diethylsulfate, benzylchloride, p-nitrobenzylchloride, benzyl bromide, ethylene chlorohydrin, ethylene bromohydrin, epichlorohydrin, ethylene oxide, propylene oxide, bromobutane and p-toluenesulfonic acid ester. Various alkylating agents may also be combined or used in admixture.

Preferred alkylating agents are sulphuric acid esters and sulphonic acid esters. When alkyl or aralkyl halides are used, it is possible to include, e.g., $ZnCl_2$, $SnCl_4$, $SbCl_5$ or $FeCl_3$ in not more than the equivalent quantity. This accelerates the reaction and increases the resistance of the end products to the effect of solvents.

Halogen alkyl carboxylates or halogen alkyl sulfonates such, for example, as sodium chloroacetate may also be used or included in the alkylation process. In that case, internal sulfonium salts, so-called thetines are formed.

Examples of sulphides are dimethylsulphide, diethylsulphide, thiodiglycol, thiodiglycollic acid, dibutylsulphide, diisoamylsulphide, dioctylsulphide, diallylsulphide, diacetalyl sulphide, diisobutenylsulphide and sulphide-β-dipropionic acid.

Ternating may be carried out at any point during the isocyanate polyaddition process or following it. Thus it is possible to react all the reaction components simultaneously together.

Ternating the polyurethane mass, i.e., reacting it with the alkylating agent or sulphide, may also be carried out in a separate reaction stage after termination of the polyisocyanate polyaddition. The reaction may be carried out without solvents, in the melt or on rubber mixing rollers or in internal mixers, but it is preferable to work in the presence of organic solvents. Especially to be recommended are the polar solvents such as alcohols, ketones and cyclic ethers, e.g., ethanol, isopropanol, acetone, methyl ethyl ketone, dioxane, tetrahydrofuran or acetonitrile. It is preferred to use solvents that are miscible with water. The concentration of the solution depends solely on the solubility properties of the polyurethane mass which is to be ternated and of the product of ternating. Non-polar media such as benzene, toluene or chlorobenzene are less suitable since spontaneous gel formation may take place in these solvents during the process of ternating, i.e., it is advisable, if the polyurethane mass has been prepared in such a solvent, to replace this solvent at least partly by one of the above mentioned polar solvents or by a mixture of such solvents.

The quantity of monofunctional alkylating agents and of sulphide used depends on the number of groups capable of being alkylated that are present in the polyurethane mass. There is no point in using an excess except in the case of volatile compounds ($CH_3Cl$, $CH_3Br$, lower alkyl sulphide such as diethyl sulfide). On the other hand, it is possible to use less than the calculated quantity of monofunctional alkylating agents in order to vary the subsequent degree of cross-linking. The minimum quantity of alkylating agent to be used is determined by the fact that the finished polyurethane resin should contain at least 1% sulphonium sulphur.

If basic tertiary amino groups are present in the polyurethane mass, it should be noted that when the polyurethane mass is treated with alkylating agents, it is generally the amino groups which are alkylated first and then the sulphide groups. In that case, the molar quantity of alkylating agent must in any case be greater than the molar quantity of tertiary amino nitrogen. If basic nitrogen atoms and sulphur atoms are present simultaneously, the alkylating agent may also be combined with acids. For example, N- and S-atoms may each be quaternated or ternated up to a certain percentage with alkylating agents, and the N-atoms still present may be converted into salts by means of acids such as hydrochloric acid or acetic acid. On the other hand, ammonium salts may first be prepared by the action of acids and the sulphide sulphur may be alkylated thereafter. The reaction may be carried out at room temperature, but higher temperatures are preferably employed, e.g., 40 to 100° C. if desired under pressure.

It is possible to include a polyfunctional alkylating agent or a polyfunctional tertiary amine or sulphide with the alkylating agent. The quantity should not exceed 50% of the total quantity of alkylating agent or tertiary amine and sulphide. Suitable polyfunctional alkylating agents include, for example, p-xylene dichloride, 1,3-dimethyl-4,6-di-(chloro-methyl)-benzene, tetrabromopentaerythritol, dibromobutane and the like.

One may mix the solvent with water from the start, but in that case care should be taken to ensure that the water present does not impair the solubility of the polyurethane mass. It is preferred to use solvents with up to 80% by weight of water. When ternating has been completed, the solvent, which is preferably a polar hydrophilic organic solvent, may be partly or completely replaced by water, when clear, opaque or also milky white aqueous solutions or dispersions of polyurethanes are formed. These may have solids contents of up to 70% by weight and pH values between 7 and 1. They are indefinitely storable and transportable.

By simply removing the solvent and subjecting the product to a moulding process, a flexible, elastic synthetic resin is obtained which is largely or completely resistant to water and hydrocarbons but is under some conditions soluble in aqueous tetrahydrofuran. This makes readily possible the production of foils and coatings and the use of the products as adhesifying agents, by pouring the solution or dispersion onto suitable supports and removing the solvent, thus so to speak forming the product at the same time. It may be advantageous to carry out the removal of the solvent at elevated temperatures, especially 40 to 150° C.

Depending on the quantity of chain-lengthening agent used, soft, elastic, flexible or hard end-products are obtained. In the last mentioned case, the part by weight of polyhydroxy compound is only 2 to 30% by weight of the total polyurethane mass.

A preferred method of carrying out the process according to the invention consists in adding 40 to 30% by weight (based on the polyhydroxy compound) of thiodiglycol as chain-lengthening agent in the preparation of the polyurethane mass, and dissolving the polyurethane mass in acetone or alcohol, if desired with the addition of water, and ternating it with dimethylsulphate. The organic solvent is then replaced completely with water. Aqueous solutions or latex-type dispersions of the ternated polyurethane mass are obtained from which a homogeneous solid elastomer film remains behind after the water has been removed by evaporation.

The products of the process, which contain sulfonium groups, have the advantage over corresponding polyurethane resins containing quaternary ammonium groups that they have improved resistance to solvents.

In addition, they are more resistant to hydrolytic influences since they contain no basic group, even if they have only been partially alkylated. The unpleasant odor which frequently adheres to synthetic resins which contain sulphur and limits the use of these products is not present or only to a slight extent in the products of the process.

It is possible to incorporate fillers and plasticisers, e.g. carbon black, precipitated silicic acid, silicic acid sols or dispersions of aluminum hydroxide, clay or asbestos in the material. The incorporation of plasticisers such as phthalates or hydrophobic oils generally does not give rise to any difficulties since they are soluble in the hydrophobic part of the polyurethane colloids. Pigments can also be incorporated.

Lastly, cross-linking agents may be added which by additional chemical cross-linking enhance the resistance to water-containing or strongly polar organic solvents or alter the mechanical properties of the products in the desired direction. Such substances include sulphur or sulphur sols, and formaldehyde or substances which give off formaldehyde or react like formaldehyde, and masked isocyanates such as phenol blocked trimer of 2,4-toluylene diisocyanate and peroxides such as dicumyl peroxide.

As regards the addition of the cross-linking agents, water-soluble cross-linking agents such as formaldehyde or methylol compounds and their ethers can simply be added to the finished colloidal solution or dispersion while the hydrophobic masked isocyanates and peroxides are advantageously dissolved in a non-polar solvent which is not miscible with water and are emulsified in the form of this solution with the polyurethane solution. The hydrophobic latex particles then take up the hydrophobic solvent together with the cross-linking agent and undergo swelling in the process. In the case of solid products of the process which are neither dissolved nor dispersed, the cross-linking agents may for example be incorporated on rubber rollers.

The products of the process are suitable as coatings and impregnating agents and also as adhesifying agents and for elastic films, foils, and filaments. Sheet-like structures may be applied by calendering or from solution. Molded articles can be obtained by pressure molding. Solutions or dispersions of the products are sprayed, knife-coated or painted. They are used as plasticisers and antistatic agents or as auxiliary agents in textile printing and in the paper industry and as protective colloids and dispersing agents if the materials to be dispersed are added to them, in which case these materials may quite easily constitute the major quantitative proportion. Again, the products of the process are worked up by removing the solvent and at the same time shaping the product. In this sense, the products of the process are suitable as emulsifiers for polymerisation reactions, additives, synthetic resin dispersions and photographic layers, as sizing agents, for impregnating leather and rawhide, for glueing split leather, for preparing glass filaments and corded fabrics, as binder for dyestuff pigments and in cosmetics, as additive to adhesives, and as hair dressing.

It is also possible to manufacture dip molded articles and foam plastics, e.g. by the latex foam boating process, from these products.

The invention is further illustrated by the following examples in which the parts are by weight unless otherwise indicated.

EXAMPLE 1

Preparation of the starting material

About 500 g. polypropylene ether glycol (OH number 56) are dried for about 30 minutes at about 130° C. and heated for about 2 hours at about 80° C. with about 228 g. of 65% 2,4- and 35% 2,6-toluylene diisocyanate. At about 50° C., about 122 g. of thiodiglycol in about 300 cc. acetone are added and then about 0.1 cc. dibutyl tin dilaurate and the mixture stirred at about 50° C. until the viscosity is about 200 stokes. This state is reached after about 90 mintues. About 400 cc. acetone are added and the mixture again stirred for about 90 minutes at about 50° C. It is then diluted with about 912 cc. acetone. Approximately a 40% polyurethane solution in acetone is obtained which on cooling solidifies thermoreversibly to a jelly.

Reaction according to the invention

About 300 g. of polyurethane solution are heated with about 3.85 cc. of dimethylsulphate for about four hours at about 60° C. About 300 cc. of water are then added dropwise and the acetone distilled off. A highly fluid latex having a solids content of about 30% and a pH of about 2 is obtained which is stable for months. When dried on a flat support, the latex leaves behind a non-sticky, tough, elastic foil which does not lose its elasticity even after prolonged storage in distilled water.

EXAMPLE 2

Preparation of the starting material

About 250 g. of a polythioether (OH number 72) obtained by condensation of about 70% by weight of thiodiglycol and about 30% by weight of 1,6-hexanediol are dehydrated and stirred for about one hour at about 80° C. with about 76 g. of a mixture of 65% 2,4- and 35% 2,6-toluylene diisocyanate. About 30 g. of N-methyl-diethanolamine in about 150 cc. of acetone are added to the melt at about 30° C. and the solution, which continuously becomes more viscous, is stirred at about 50° C. About 200 cc. of acetone are added after about 90 minutes, and approximately a further 200 cc. of acetone after approximately a further 90 minutes and about 340 cc. of acetone after approximately a further 5 hours. A viscous 30% polyurethane solution is obtained which contains about 0.064 mol of tertiary nitrogen in about 300 g. of solution. The viscosity is about 30 stokes.

Reaction according to the invention

About 300 g. of the solution of the polyurethane in acetone are stirred with about 5.9 cc. of dimethylsulphate for about 30 minutes at about 50° C., during which operation about 90% of the tertiary amino-nitrogen present is alkylated while there is a marked increase in viscosity. The solution is then treated with about 1.8 cc. of dimethylsulphate for about 2 hours at about 60° C. to alkylate some of the sulphur atoms. The viscous, opaque turbid solution is treated with about 400 cc. of water and the acetone is distilled off in vacuo. A highly fluid, opaque, colloidal aqueous 20% solution is obtained which when dried on a surface yields completely non-sticky, flexible elastic foils of good strength. The foils are insoluble in water and in ethyl acetate, benzene and acetone.

The non-alkylated solution of the initial polyurethane, on the other hand, dries to a soft plastic material which cannot be lifted from the support and is soluble in organic solvents.

EXAMPLE 3

About 300 g. of a solution of the starting material described in Example 2 are treated with about 11.8 cc. of dimethylsulphate in about 100 cc. of tetrahydrofuran and stirred of about 30 minutes at about room temperature. About 100 cc. of acetone containing about 3 cc. of water are gradually added to the mass which progressively becomes more viscous, and thereafter about 200 cc. of tetrahydrofuran containing about 2 cc. of water are added. The clear solution is then heated for about 4 hours at about 80° C. and treated while still hot with about 400 cc. of water. When the acetone has been distilled off, the 24% aqueous solution is obtained which, although clear, is highly viscous owing to association of the macro-molecules, and it has pH of between 1 and 1.5 and dries to form hard, firm coatings which are insoluble in organic solvents but are slowly dissolved by water.

EXAMPLE 4

Preparation of the starting material

About 250 g. of the polythioether from Example 2 are dehydrated and stirred for about one hour at about 80° C. with about 122 g. of a mixture of 65% 2,4- and 35% 2,6-toluylene diisocyanate. About 60 g. of N-methyl-diethanolamine in about 200 cc. of acetone are added to the melt at about 30° C. and the solution, which progressively becomes more viscous, is stirred at about 50° C. After about 90 minutes, about 300 cc. of acetone and after a further hour, about 300 cc. of acetone and after a further 4 hours about 480 cc. of acetone are added. A turbid non-homogeneous, 30% polyurethane solution is obtained which, when left to stand separates into two layers, the upper layer consisting of acetone and the lower layer of a concentrated solution of polyurethane in acetone. About 300 g. of the solution contain about 0.105 mol of tertiary nitrogen. After the addition of a small quantity of tetrahydrofuran, a clear, highly viscous solution is obtained.

Reaction according to the invention

About 300 g. of the solution of polyurethane in acetone are stirred at about 50° C. for about 30 minutes with about 9.7 cc. of dimethylsulphate to alkylate the tertiary amino nitrogen and with about 3 cc. of dimethylsulphate to alkylate the sluphide sulphur, separation into two layers taking place. After the addition of about 200 cc. of water, the reaction mass is again to a large extent homogeneous and it is then kept for a further 3 hours at about 70° C. About 580 cc. of water are then added and the acetone is distilled off. An opaque, aqueous, colloidal, 12% solution of polyurethane is obtained which dries at room temperature to flexible tough elastic foils of high tensile strength. The foils are resistant to water and solvents.

It is to be understood that the foregoing working examples are given for the purpose of illustration and that any other suitable sulphur containing polymer alkylating agent, solvent, catalyst or the like can be used therein provided that the teachings of this description are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of plastics which contain from about one to about seven percent sulfonium groups which comprises reacting an organic compound containing two active hydrogen containing groups as determined by the Zerewitinoff method with an organic polyisocyanate, at least one of the components containing sulphide sulphur atoms which are at least partially alkylated or sulphide sulphur atoms which are subsequently at least partially alkylated.

2. The product of the process of claim 1.

3. The process of claim 1 wherein an uncrossed-linked reaction product of an excess of an organic diisocyanate and a polyalkylene ether glycol having free NCO groups is reacted with a thioether glycol in such proportions that there is a chain length of at least 30 atoms between sulfonium groups.

4. The process of claim 3 wherein the reaction is carried out in a solvent, the reaction mixture is mixed with water and the water is subsequently removed at an elevated temperature of about 40 to about 150° C.

5. The process of claim 1 wherein said plastic contains from one to five percent sulfonium groups.

6. Process of claim 1 wherein said plastic contains partially alkylated halogen atoms or partially alkylated R—SO$_2$—O-groups wherein R is an alkyl or aryl radical.

References Cited

UNITED STATES PATENTS

| | | | |
|---|---|---|---|
| 2,989,512 | 6/1961 | Nischk et al. | 260—77.5 |
| 3,027,354 | 3/1962 | Holtschmidt et al. | 260—77.5 |
| 3,077,464 | 2/1963 | Simon et al. | 260—77.5 |
| 3,169,119 | 2/1965 | Dankert et al. | 260—2.5 |
| 3,197,440 | 7/1965 | Verbanc | 260—77.5 |
| 3,326,862 | 6/1967 | Wagner et al. | 260—77.5 |
| 3,338,875 | 8/1967 | Costanza et al. | 260—79 |

FOREIGN PATENTS

| | | |
|---|---|---|
| 90,002 | 7/1957 | Norway. |
| 245,592 | 7/1963 | Australia. |
| 1,034,263 | 6/1966 | Great Britain. |
| 1,043,260 | 9/1966 | Great Britain. |
| 1,066,488 | 4/1967 | Great Britain. |
| 639,107 | | Belgium. |
| 640,789 | | Belgium. |
| 697,189 | | Italy. |
| 707,263 | | Italy. |
| 1,379,133 | | France. |
| 1,383,252 | | France. |

DONALD E. CZAJA, *Primary Examiner.*

F. McKELVEY, *Assistant Examiner.*

U.S. Cl. X.R.

96—88; 117—142, 161; 156—331; 167—87; 252—8.8, 357; 260—2.5, 31.2, 37, 67, 75